United States Patent [19]

Maruya

[11] Patent Number: 5,406,642
[45] Date of Patent: Apr. 11, 1995

[54] IMAGE MATCHING METHOD USING DIRECTION SENSITIVITY AND VECTOR SMOOTHING FUNCTIONS FOR CORRECTING MATCHES

[75] Inventor: Makoto Maruya, Tokyo, Japan
[73] Assignee: NEC Corporation, Tokyo, Japan
[21] Appl. No.: 44,077
[22] Filed: Apr. 6, 1993

Related U.S. Application Data

[63] Continuation of Ser. No. 455,251, Dec. 22, 1989, abandoned.

[30] Foreign Application Priority Data

Dec. 23, 1988 [JP] Japan .................... 63-326806

[51] Int. Cl.$^6$ .................................. G06K 9/68
[52] U.S. Cl. ............................ 382/34; 382/42; 382/44; 348/154
[58] Field of Search ............... 382/34, 30, 16, 41, 382/42, 44; 358/136; G06K 9/46, 9/66, 9/68, 9/36, 9/64; H04N 7/12; 348/154, 155

[56] References Cited

U.S. PATENT DOCUMENTS

| | | | |
|---|---|---|---|
| 4,677,476 | 6/1987 | Kondo | 358/136 |
| 4,736,437 | 4/1988 | Sacks et al. | 382/34 |
| 4,805,224 | 2/1989 | Koezuka et al. | 382/34 |

OTHER PUBLICATIONS

"The Motion Coherence Theory"; Alan L. Yuille and Norberto M. Grzyacz; IEEE; pp. 344–353; 1988.

*Primary Examiner*—Yon J. Couso
*Attorney, Agent, or Firm*—Leydig, Voit & Mayer

[57] ABSTRACT

In a block matching method, a successive one of segmented blocks of a first image is superimposed on a portion of a second image, and a correlation is detected therebetween. The superimposed block is successively moved by a small amount and correlations are repeatedly detected for different locations of the successively moved block. A maximum value of the correlations is detected and a vector representing the location of the block of the maximum correlation is stored into a memory as a match between a block of the first image and a portion of the second image. The process is repeated for the remaining blocks of the first image to create a map of the matching vectors in the memory. Direction sensitivity functions and vector smoothing functions are derived from the segmented blocks for respectively correcting the stored matching vectors. In a preferred embodiment, prior to the successive movement of the block, a first direction sensitivity function is derived from the block and a second direction sensitivity function from the corresponding portion of the second image. Correlation is detected between these functions and the block is successively rotated by a small angle, and the derivation of these functions and the detection of correlations therebetween are repeated to detect a maximum correlation. The orientation of the block is set to the angle of the the maximum correlation. A gradient method is employed for deriving optimum values for correcting the stored vectors.

7 Claims, 4 Drawing Sheets

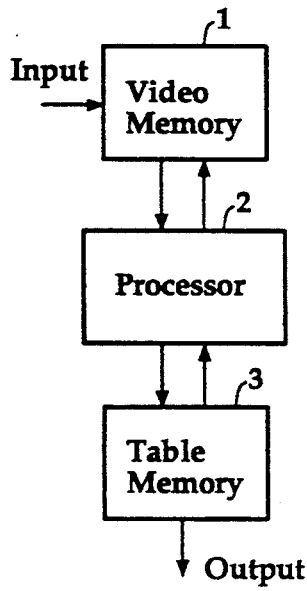
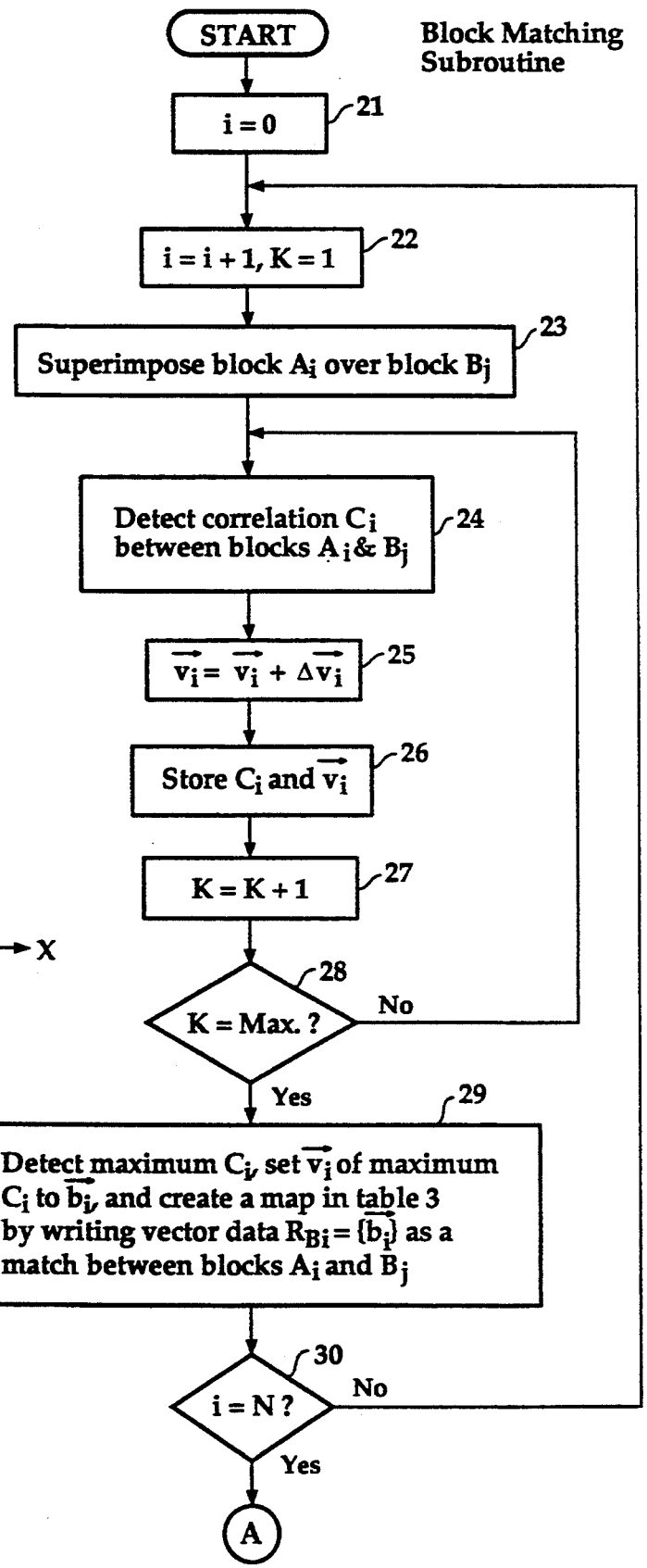

Block Matching and DS Functions Calculation Subroutine

IMAGE MATCHING METHOD USING DIRECTION SENSITIVITY AND VECTOR SMOOTHING FUNCTIONS FOR CORRECTING MATCHES

This application is a continuation of application Ser. No. 07/455,251, filed Dec. 22, 1989, now abandoned.

BACKGROUND OF THE INVENTION

The present invention relates to an image matching method.

Two methods are known in the art of image analysis. One is the motion coherence method using "interest" operators and is described in an article "The Motion Coherence Theory" by Alan L. Yuille and Norberto M. Grzywacz, International Conference on Computer Vision, I.E.E.E., pages 344–353, 1988. The other is the block matching method which is described in Japanese Patent 62-107386 "Image Matching Method" and in U.S. Pat. No. 4,677,476 issued to T. Kondo, "Method for Detecting a Movement of a Television Signal." With the former technique, characteristic features of an image are detected using an "interest" operator and coincidence is detected between them. However, the features that can be extracted from a given image are limited in number and hence it is insufficient for detailed image analysis. In addition, available features are further limited to those having the same degree of reliability in all directions. For example, even if a brightness gradient exists in some point of an image, the features of this point cannot be extracted if that gradient exists only in one direction. To estimate possible correspondences between image points from which characteristic features cannot be extracted, a smoothing technique has been proposed to increase the number of available correspondences. However, the degree of precision attained with this approach is not satisfactory for high density matching.

With the block matching technique, a first image is segmented into a plurality of blocks and correlations between the first image and a second one are detected while moving each of the blocks in the same direction with respect to the second. When a maximum correlation value is detected, the block corresponding to that maximum correlation is identified as one corresponding to a portion of the second image. Although the number of possible correspondences available for high density matching may be satisfactory with the block matching method, one disadvantage is that a large number of errors occur when detecting matches between corresponding features. More specifically, if the brightness variations of a block are scarce, difficulty arises to detect a match, and if the brightness gradients of a given block exist only in one direction, a match may be detected with more than one corresponding block in the other image if the latter has a brightness gradient of the same direction as that of the given block, failing to uniquely detect a match. In addition, the parallel movement of a segmented block fails to detect a perfect match at a true point of correspondences if the images being compared contain features having a rotational relationship with each other.

SUMMARY OF THE INVENTION

It is therefore an object of the present invention to provide a method which employs direction sensitivity function and vector smoothing function for correcting matches detected between images.

According to the present invention, a successive one of segmented blocks of a first image is superimposed on a portion of a second image and a correlation is detected therebetween. The superimposed block is successively moved by a predetermined amount and correlations are repeatedly detected for different locations of the successively moved block A maximum value of the correlations is detected and a vector representing the location of the block of the maximum correlation is stored into a memory as a match between a block of the first image and a portion of the second image. The process is repeated for the remaining blocks of the first image to create a map of the matching vectors in the memory. Direction sensitivity functions and vector smoothing functions are derived from the segmented blocks of the first image and a gradient method is employed for deriving optimum correction values from these functions for replacing the matching vectors stored in the memory.

Prior to the successive vector movement of the block, a first direction sensitivity function is preferably derived from the block of the first image and a second direction sensitivity function is derived from the corresponding portion of the second image. Correlation is then detected between the first and second direction sensitivity functions. The block is successively rotated by a predetermined small angle with respect to the second image, and the derivation of the first and second direction sensitivity functions and the detection of the correlation therebetween are repeated for each successive rotation to produce a plurality of correlations between the direction sensitivity functions. A maximum value is detected from such correlations, and the orientation of the block is set to the angle at which the maximum value is detected.

BRIEF DESCRIPTION OF THE DRAWINGS

The present invention will be described in further detail with reference to the accompanying drawings, in which:

FIG. 1 is a schematic block diagram of a system employed in the present invention;

FIGS. 2A and 2B are flowcharts describing a sequence of instructions performed by the processor of FIG. 1 according to a first embodiment of the invention;

FIG. 4 is an illustration of the coordinate system of an image plane on which a segmented block of image is placed.

DETAILED DESCRIPTION

Figure 2B:
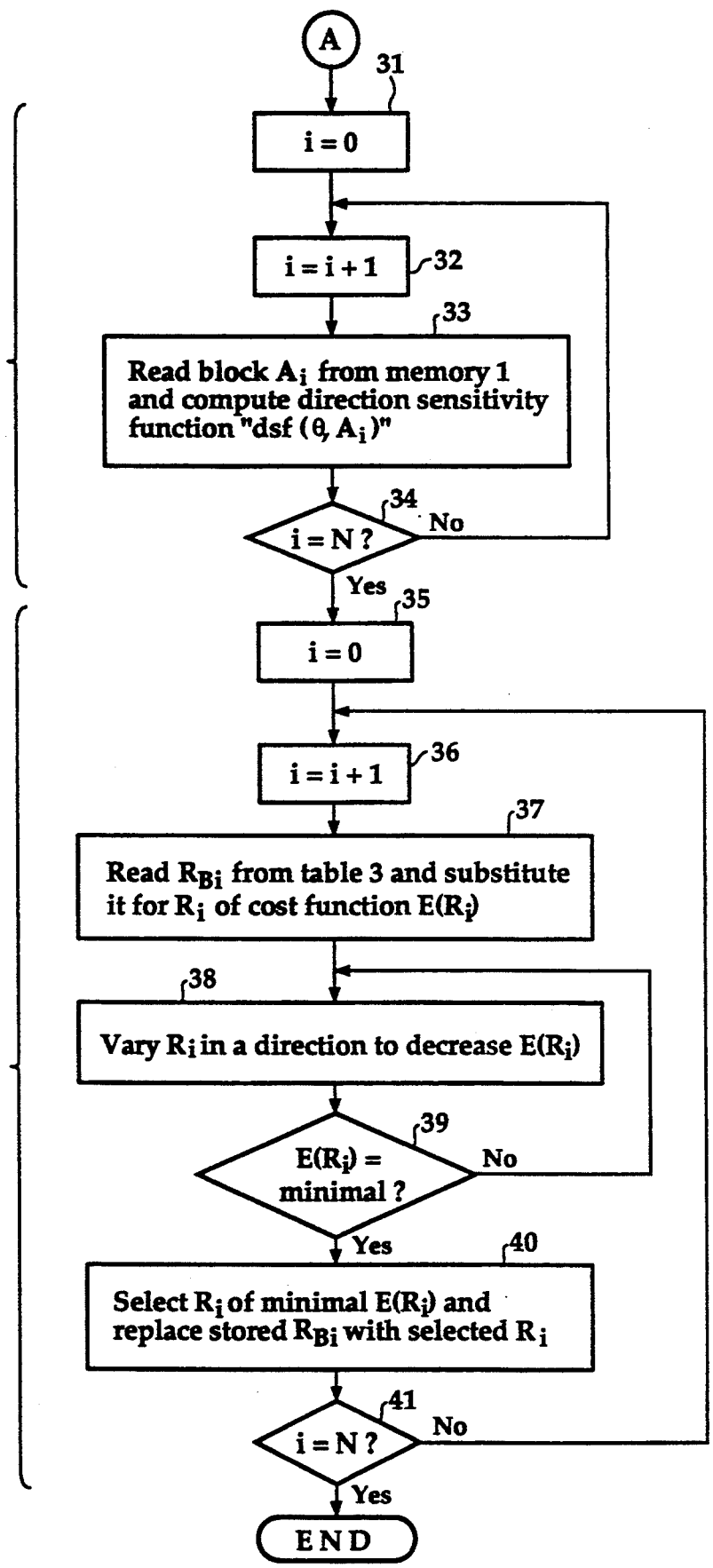

Referring now to FIG. 1, there is shown an apparatus for detecting a match between two images stored in a video memory 1 which is controlled by a processor 2 using a block matching algorithm. A table memory 3 is associated with the processor to store matching vectors representing matches between segmented blocks of a first image and those of a second image. Processor 2 is a micro-processor based controller which is programmed to perform a sequence of instructions illustrated in FIGS. 2A and 2B. The process to be performed by processor 2 is divided into three subroutines: block matching, direction sensitivity function calculation and gradient method correction. The block matching and direction sensitivity function calculation are performed independently in separate subroutines either in a sequential or in a parallel mode. In the block matching subroutine, a maximum correlation is detected between each one of the segmented blocks of the first image and a corresponding block of the second image and mapped in the table memory 3. The direction sensitivity function is calculated on each block of the first image. The gradient method correction is performed in a subroutine in which the vectors mapped in the table memory 3 are corrected in accordance with a cost function including the calculated direction sensitivity function and a smoothing function.

The images stored in video memory 1 are designated A and B, respectively, and image A is segmented into a plurality of blocks $A_i$, where i is an integer in the range between 1 and N. As will be described hereinbelow, each image block $A_i$ is superimposed on a block $B_j$ of image B to detect a correlation therebetween and then successively displaced along a predetermined vector to store a plurality of such correlations and associated vectors. A maximum value of the stored correlations is determined to identify the vector associated with the maximum correlation as a matching vector $R_{Bi}$ between block $A_i$ and block $B_j$. The matching vector $R_{Bi}$ is stored in the table memory 3 for later correction with a direction sensitivity function.

FIG. 2A represents the block matching subroutine. The program execution of this subroutine starts with an initialization step 21 which resets a variable i to zero. Exit then is to operations step 22 which increments the variable i by one and resets a count K to one. Operations step 23 follows which directs the placing of block $A_i$ over a block $B_j$ of image B. Correlation $C_i$ is detected between block $A_i$ and block $B_j$ (step 24) and block $A_i$ is displaced over the image B by a predetermined vector $\Delta\vec{v}_i$ by incrementing a vector value $\vec{v}_i$ by an amount $\Delta\vec{v}_i$ (step 25). The correlation $C_i$ and vector $\Delta\vec{v}_1$ derived in steps 24 and 25 are stored in memory (step 26) and count K is incremented by one (step 27). Exit then is to decision step 28 which checks to see if K is maximum. If the answer is negative, control returns to step 24 to repeat the process so that block $A_i$ is moved successively over image B and a plurality of correlations $C_i$ and the associated vectors $\vec{v}_i$ are derived for block $A_i$ from the successive displacements.

If the answer in decision step 28 is affirmative, control advances to operations step 29 which directs the detecting of the maximum value of the stored correlation values $C_i$ to recognize that block $A_i$ matches block $B_j$ of image B after the displacement of block $A_i$ along vector $\vec{v}_i$. The vector $\vec{v}_i$ of the maximum correlation is set to $\vec{b}_i$ as a matching vector and stored in the table memory 3 as a relationship $R_{Bi}(=\vec{b}_i)$ between block $A_i$ and block $B_j$.

Control now exits to decision step 30 to check to see if variable i is equal to N. If the answer is negative in step 30, control returns to step 22 to repeat the above steps, so that the next image block $A_i$ is moved over image B for determining a correlation and successively moved to derive a plurality of such correlations with respect to that image block $A_i$. When the above steps are performed on all blocks of image A, the answer in decision step 30 becomes affirmative, and control exits to the starting point of the subroutine of direction sensitivity function calculation shown in FIG. 2B.

In FIG. 2B, variable i is initialized to zero in step 31 and incremented by one in step 32. The image data of block $A_i$ is read out of video memory 1 and the following computation of direction sensitivity function is performed on the image data of block $A_i$:

$$dsf(\theta, A_i) = \int\int_{A_i} \left(\frac{\partial^2 f}{\partial \vec{n}^2}\right)^2 dA_i. \tag{1}$$

where, f is the luminance of image block $A_i$, n is an integer, and $\partial f/\partial \vec{n}$ is a derivative of the luminance value of block $A_i$ in a direction of angle $\theta$ relative to the x-axis of an image plane as shown in FIG. 4.

Control proceeds to decision step 34 to check to see if variable i is equal to N. If the answer is negative, control returns to step 32 to repeat the process for the remaining blocks $A_i$. When the direction sensitivity function (dsf) is obtained for all blocks $A_i$, control exits from the direction sensitivity function derivation subroutine and enters the gradient method subroutine which includes steps 36 to 40.

At the beginning of the gradient method subroutine, variable i is initialized to zero (step 35) and control proceeds to step 36 in which matching vector data $R_{Bi} = \{\vec{b}_i | i=1, 2 \ldots N\}$ is read out of table memory 3 to substitute it for the vector $R_i$ of the following cost function:

$$E(R_i) = D(R_{Bi}, R_i) + S(R_i) \tag{2}$$

where, $R_i = \{\vec{r}_i | i=1, 2 \ldots N\}$, and $\vec{r}_i$ is a vector variable. $D(R_{Bi}, R_i)$ indicates the degree of reliability of a match between images A and B for different orientations of block $A_i$ and is represented by a distance between $R_{Bi}$ and $R_i$ weighted by a direction sensitivity function as follows:

$$D(R_{Bi}, R_i) = \sum_{i=1}^{i=N} dsf(\theta_i, A_i) |\vec{b}_i - \vec{r}_i|^2 \tag{3}$$

and $S(R_i)$ is a vector smoothing function representing the degree of smoothness of the vectors $R_i (=\vec{r}_i)$, and is given by the following formula:

$$S(R_i) = \sum_{i=1}^{i=N} [C_0|\vec{r}_i|^2 + C_1|\nabla\vec{r}_i|^2 + C_2|\nabla^2\vec{r}_i|^2] \tag{4}$$

where, $C_0$, $C_1$ and $C_2$ are constants and $\theta_i$ is the angle formed between vector $\vec{b}_i$ and the x-axis of the image plane, and $\nabla$ is Hamilton operator.

Exit then is to operations step 38 which causes $R_i$ to increment or decrement in such a direction to decrease the cost function $E(R_i)$. Control moves to decision step 39 to detect if the cost function $E(R_i)$ is minimal. If the answer is negative, control returns to operations step 38 to cause the cost function to decrease successively. On reaching a minimum value, the exit from decision step 39 is to operations step 40 which directs the selecting of the vector $R_i$ of the minimal cost function and the replacing of the stored matching vector value $R_{Bi}$ with the selected vector value $R_i$, thus correcting the value previously obtained by the block matching subroutine. Control now exits to decision step 41 to check to see if the correction is complete for all blocks of image A. If not, control returns to step 36 to repeat the process. When all contents of table memory 3 are rewritten with correction data, control exits the correction subroutine and a set of corrected block matching data are available from table memory 3.

Figure 3A:
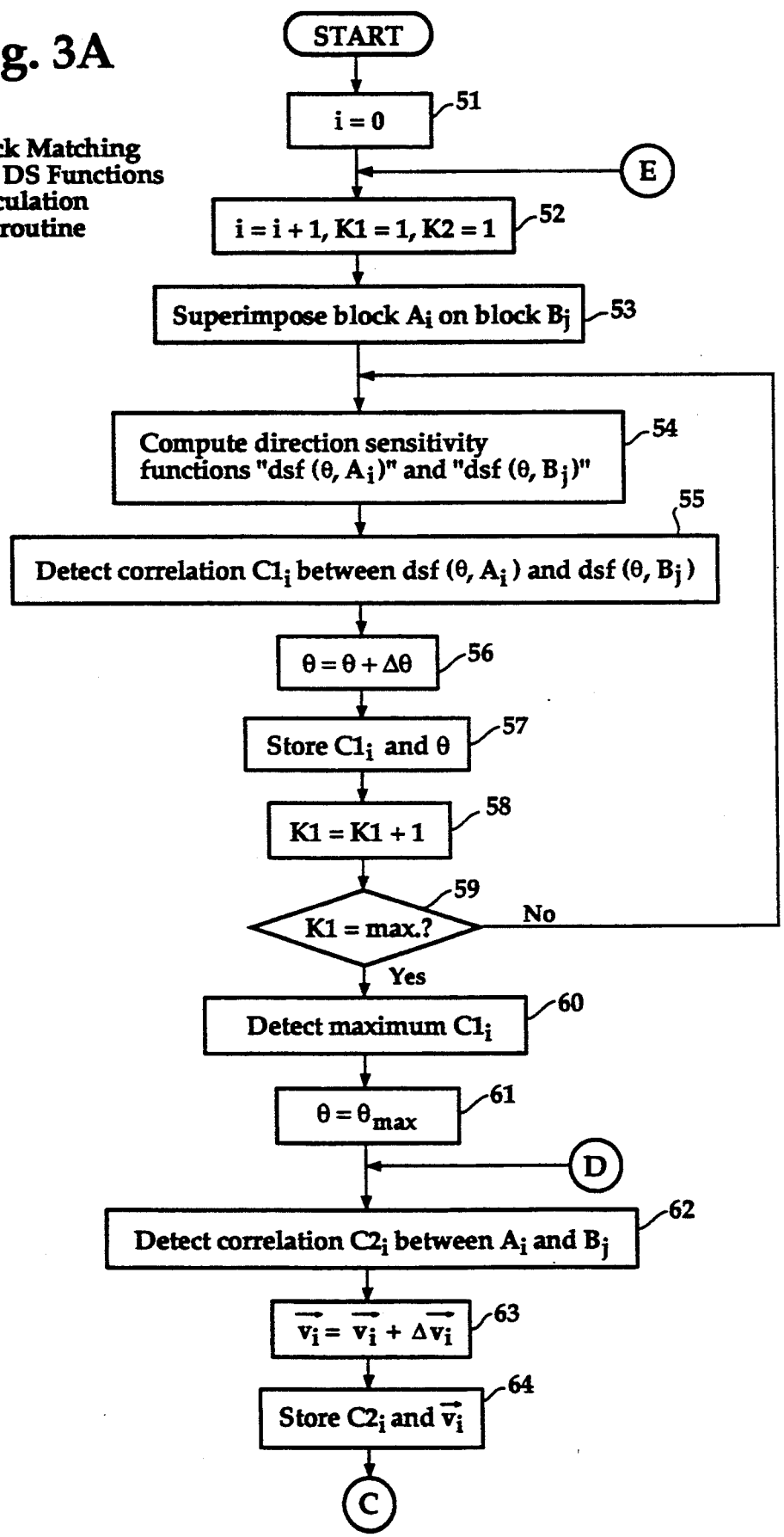
FIGS. 3A and 3B are flowcharts describing a sequence of instructions performed by the processor of FIG. 1 according to a second embodiment of the invention.
Figure 3B:
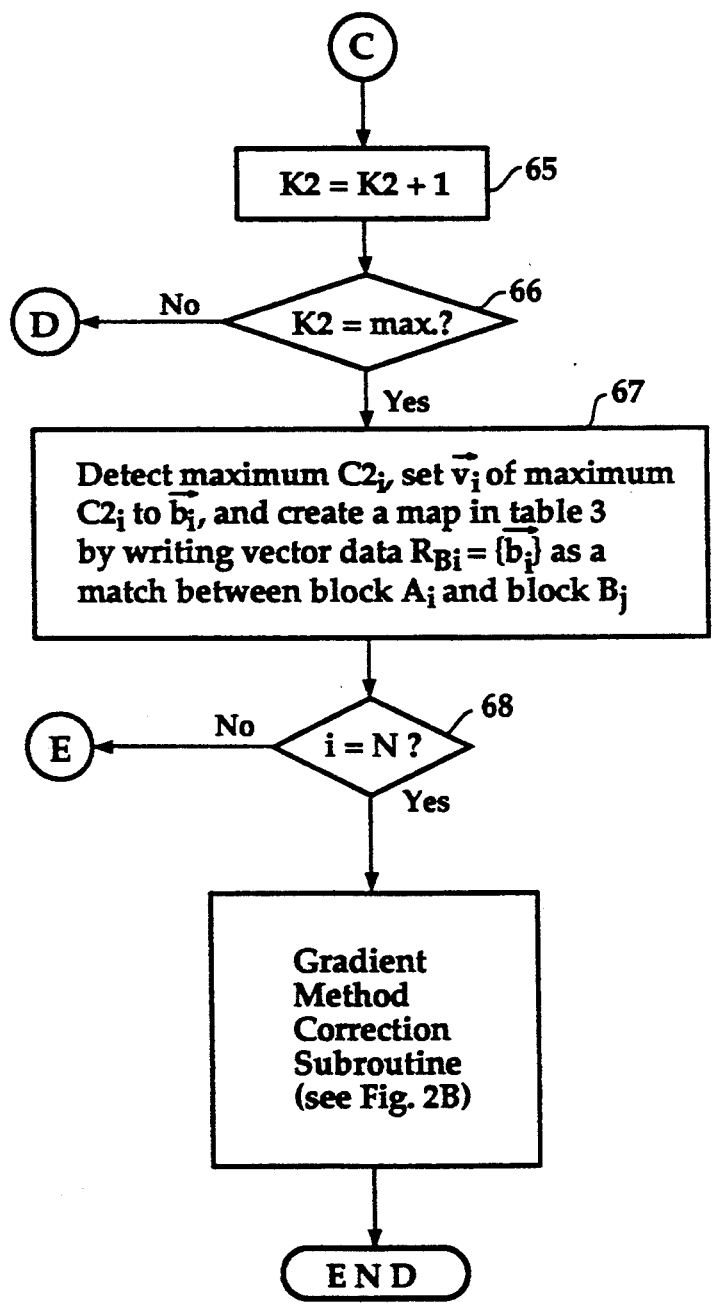

In a modified embodiment of this invention, the processor 2 is programmed as shown in FIGS. 3A and 3B. In this modification, block matching and direction sensitivity function calculation are carried out in a single subroutine in which block $A_i$ is successively rotated with respect to block $B_j$ and direction sensitivity functions are respectively derived from the rotations to detect the angle at which the correlation maximizes, followed by the step of successive displacements of block $A_i$ over image B for detecting maximum correlation between blocks $A_i$ and $B_j$. This embodiment is particularly useful for applications in which block matching cannot uniquely be determined due to the fact that the gradient of luminance values is biased in a particular direction, or insignificant.

The program starts with an initialization step 51 to reset the variable i to zero and control moves to step 52 to increment the variable i by one and initializes count values K1 and K2 to one. Exit then is to step 53 to superimpose block $A_i$ on block $B_j$. In a subsequent step 54, direction sensitivity functions dsff($\theta$, $A_i$) and dsf ($\theta$, $B_j$) are calculated for blocks $A_i$ and $B_j$ using the following Equations (1) and (5).

$$dsf(\theta,B_j) = \int\int_{B_j} \left(\frac{\partial^2 f}{\partial \vec{n}^2}\right)^2 dB_j \quad (5)$$

Correlation $C1_i$ between dsf($\theta$, $A_i$) and dsf ($\theta$, $B_j$) is detected (step 55) and block $A_i$ is rotated by a predetermined small angle $\Delta\theta$ (step 56). The detected value of correlation $C1_i$ and the angle $\theta$ of block $A_i$ are stored in memory (step 57) and count K1 is incremented by one (step 58). Steps 54 to 58 are repeated until K1 becomes equal to a prescribed maximum value (step 59).

In step 60, the maximum value of the stored correlations $C1_i$ is detected and in step 61, block $A_i$ is rotated by an amount $\theta_{max}$ equal to the angle $\theta$ associated with the maximum correlation $C1_i$. Control then proceeds to step 62 to detect a correlation $C2_i$ between blocks $A_i$ and $B_j$. Block $A_i$ is then displaced by a predetermined amount (step 63), the correlation $C2_i$ and vector $\vec{v_i}$ are stored in memory (step 64), and count K2 is incremented by one (step 65). Steps 62 to 65 are repeated until K2 reaches a predetermined maximum value (step 66). Control advances to step 67 in which the maximum value of the stored correlations $C2_i$ is detected and the vector $\vec{v_i}$ of the maximum correlation is set to $\vec{b_i}$ as a matching vector, which is stored into the table memory 3 as a match $R_{Bi}(=\vec{b_i})$ between block $A_i$ and block $B_j$. If variable i is not equal to N, control exits from step 68 to step 52 to repeat the above process with respect to the remaining blocks of image A, whereupon control enters the gradient method correlation subroutine which is identical to that shown in FIG. 2B.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for matching first and second images located on an image plane using a processor, said first and second images being segmented into a plurality of blocks, comprising the steps of:

a) retrieving a segmented block of the first image and a segmented block of the second image from a first memory;

b) superimposing the segmented block of the first image on the segmented block of the second image using the processor;

c) detecting a correlation between the superimposed block of the first image and the segmented block of the second image using the processor;

d) moving the superimposed block of the first image by a predetermined amount in the image plane and representing a location of the superimposed block with respect to a reference point of the image plane by a vector;

e) repeating the steps c) and d) to produce a plurality of said correlations and a plurality of said vectors;

f) detecting a maximum of said correlations and storing the vector associated with the maximum correlation into a second memory as a matching vector;

g) repeating the steps (a) to (e) to create a map of the matching vectors in a second memory; and h) replacing each of said matching vectors in a second memory with a correction vector which minimizes a sum of a direction sensitivity function of said block and a smoothing function of said block, said direction sensitivity function being represented by a squared value of second order of a differential equation of luminance distribution of said block.

2. A method as claimed in claim 1, wherein said direction sensitivity functions are represented by:

$$dsf(\theta,A) = \int\int_A \left(\frac{\partial^2 f}{\partial \vec{n}^2}\right)^2 dA$$

where, A represents each of said segmented blocks, f is a luminance value of each of said blocks, n is an integer, $\theta$ is the angle of orientation of each of said blocks on said image plane, and $\partial f/\partial \vec{n}$ is a derivative of the luminance value of each of said blocks in a direction of said angle.

3. A method as claimed in claim 2, wherein the sum of the direction sensitivity function of the block and the smoothing function of the block is represented by:

$$\sum_{i=1}^{i=N} dsf(\Theta_i, A_i)|\vec{b_i} - \vec{r_i}|^2 +$$

$$\sum_{i=1}^{i=N} [C_0|\vec{r_i}|^2 + C_1|\nabla\vec{r_i}|^2 + C_2|\nabla^2\vec{r_i}|^2]$$

where, i is an integer in the range between 1 and N, where N represents a total number of said segmented blocks, $\vec{b_i}$ represents the matching vector associated with a block $A_i$ of said first image, $\vec{r_i}$ represents a vector variable for said block $A_i$, $C_0$, $C_1$ and $C_2$ are constants, $\Theta_i$ is the angle of orientation of said matching vector $\vec{b_i}$ and $\nabla$ is Hamilton operator, and the step (g) further includes the steps of:

g1 varying said $\vec{r_i}$ vector until said function decreases to a minimum; and g2) replacing said matching vector $\vec{b_i}$ with the $\vec{r_i}$ vector which is obtained by the step g1) when said function reaches said minimum.

4. A method for matching first and second images located on a common image plane, said first image being segmented into a plurality of blocks, comprising the steps of:
   a) superimposing a successive one of said segmented blocks on a portion of the second image;
   b) deriving a first direction sensitivity function from the superimposed block of said first image and a second direction sensitivity function from said portion of the second image;
   c) detecting a first correlation between said first and second direction sensitivity functions;
   d) rotating said superimposed block by a predetermined angle with respect to said portion of said second image;
   e) repeating the step (c) and (d) to produce a plurality of said first correlations for different angles of orientations of the successively rotated block;
   f) detecting a maximum of said first correlations;
   g) setting the orientation of said block to the angle at which the maximum first correlation is detected;
   h) detecting a second correlation between the block of the step (g) and a corresponding portion of said second image;
   i) moving said block by a predetermined amount in said plane and representing the location of the moved block with respect to a reference point of said image plane by a vector;
   j) repeating the steps (h) and (i) to produce a plurality of said second correlations and a plurality of said vectors;
   k) detecting a maximum of said second correlations and storing one of said vectors associated with the maximum second correlation into a memory as a matching vector;
   l) repeating the steps (a) to (k) to create a map of the matching vectors in said memory; and
   m) replacing each of said matching vectors in said memory with a correction vector which minimizes a sum of said first direction sensitivity function and a smoothing function of said block, said direction sensitivity function being represented by a squared value of second order of a differential equation of luminance distribution of said block.

5. A method as claimed in claim 4, wherein said first direction sensitivity function is represented by:

$$dsf(\theta,A) = \int\int_A \left(\frac{\partial^2 f}{\partial n^2}\right)^2 dA$$

and said second direction sensitivity function is represented by:

$$dsf(\theta,B) = \int\int_B \left(\frac{\partial^2 f}{\partial n^2}\right)^2 dB$$

where, A represents each of said segmented blocks, B represents each of said portions on which said block A is superimposed, f is a luminance value of each of said blocks A and said portion B, n is an integer, $\theta$ is the angle of orientation of each of said blocks on said image plane, and $\partial f/\partial \vec{n}$ is a derivative of the luminance value of each of said blocks and each of said portions of the second image in a direction of said angle.

6. A method as claimed in claim 5, wherein the sum of the first direction sensitivity function and the smoothing function is represented by:

$$\sum_{i=1}^{i=N} dsf(\Theta_i,A_i)|\vec{b}_i - \vec{r}_i|^2 +$$

$$\sum_{i=1}^{i=N} [C_0|\vec{r}_i|^2 + C_1|\nabla\vec{r}_i|^2 + C_2|\nabla^2\vec{r}_i|^2]$$

where, i is an integer in the range between 1 and N, where N represents a total number of said segmented blocks, $\vec{b}_i$ represents the matching vector associated with a block $A_i$ of said first image, $\vec{r}_i$ represents a vector variable for said block $A_i$, $C_0$, $C_1$ and $C_2$ are constants, $\Theta_i$ is the angle of orientation of said matching vector $\vec{b}_i$ and $\nabla$ is Hamilton operator, and the step (m) further includes the steps of:
   m1) varying said vector $\vec{r}_i$ until said function decreases to a minimum; and
   m2) replacing said matching vector $\vec{b}_i$ with the vector $\vec{r}_i$ which is obtained by the step (m1) when said function reaches said minimum.

7. A method for matching first and second images located on an image plane, comprising the steps of:
   (a) segmenting the first image into a plurality of blocks;
   (b) storing the segmented first image in a first memory;
   (c) storing a second image in the first memory;
   (d) superimposing a successive one of the segmented blocks on a portion of the second image;
   (e) detecting a correlation between the segmented block and the portion of the second image upon which the segmented block is superimposed;
   (f) displacing the segmented block in the image plane over the second image by a predetermined amount after a correlation has been detected and representing a location of the block with respect to a reference point of the image plane by a vector which is associated with the detected correlation;
   (g) repeating steps (c) and (d) to produce a plurality of correlations and a plurality of vectors;
   (h) detecting a maximum correlation from among the plurality of correlations and storing the vector associated with the maximum correlation into a second memory as a matching vector;
   (i) repeating steps (b) to (f) to create a map of the matching vectors in the second memory; and
   (j) replacing each of the matching vectors in the memory with a correction vector which minimizes a sum of a direction sensitivity function of the block and a smoothing function of the block, the direction sensitivity function defining a squared value of a second order of a differential equation of luminance distribution of the block and the smoothing function defining the degree of smoothness of the correction vector.

* * * * *